(12) United States Patent
Lucatello (10) Patent No.: US 7,707,978 B2
(45) Date of Patent: May 4, 2010

(54) INTERNAL COMBUSTION ENGINE WITH TORQUE ADJUSTABLE IN EACH CYLINDER

(75) Inventor: Marco Lucatello, Turin (IT)

(73) Assignee: C.R.F. Società Consortile per Azioni, Orbassino (Torino) (IT)

( * ) Notice: Subject to any disclaimer, the term of this patent is extended or adjusted under 35 U.S.C. 154(b) by 0 days.

(21) Appl. No.: 12/324,059

(22) Filed: Nov. 26, 2008

(65) Prior Publication Data

US 2009/0150049 A1    Jun. 11, 2009

(30) Foreign Application Priority Data

Dec. 4, 2007    (EP) .................................. 07425771

(51) Int. Cl.
*F02D 41/00*    (2006.01)
(52) U.S. Cl. .................... 123/90.15; 123/345; 123/305; 123/406.44; 123/676
(58) Field of Classification Search ................ 123/345, 123/90.15, 443, 305, 406.45, 346, 90.16, 123/90.12, 406.44, 672, 673, 676
See application file for complete search history.

(56) References Cited

U.S. PATENT DOCUMENTS

| | | | |
|---|---|---|---|
| 7,128,052 B1 * | 10/2006 | Reed et al. ............. | 123/406.45 |
| 7,246,595 B1 * | 7/2007 | Hoare et al. ................ | 123/294 |
| 7,254,473 B2 * | 8/2007 | Kojima et al. ............... | 701/105 |
| 7,377,236 B2 * | 5/2008 | Reed et al. .................... | 123/21 |
| 7,503,312 B2 * | 3/2009 | Surnilla et al. .......... | 123/406.45 |

FOREIGN PATENT DOCUMENTS

| | | |
|---|---|---|
| DE | 199 27 951 | 3/2000 |
| DE | 101 01 593 | 7/2002 |
| DE | 10 2005 010673 | 9/2006 |
| EP | 0 931 912 | 7/1999 |

OTHER PUBLICATIONS

European Search Report for EP Application No. 07 42 5771, dated May 19, 2008.

\* cited by examiner

*Primary Examiner*—Hai H Huynh
(74) *Attorney, Agent, or Firm*—Nixon & Vanderhye P.C.

(57) ABSTRACT

Multi-cylinder internal combustion engine wherein the intake valves, the injector means and the ignition means are controlled so as to adjust the enthalpy value of the exhaust gases produced by each cylinder independently from the other cylinders.

13 Claims, 5 Drawing Sheets

INTERNAL COMBUSTION ENGINE WITH TORQUE ADJUSTABLE IN EACH CYLINDER

BACKGROUND OF THE INVENTION

The present invention relates to multi-cylinder internal combustion engines of the type including:
- at least one intake valve for each cylinder to control communication between the respective intake pipe and the combustion chamber of the respective cylinder,
  wherein each intake valve is controlled by actuator means to feed a determined quantity of air into said combustion chamber, said actuator means being adapted to control the respective intake valve independently from the other cylinders and according to a variable actuation method,
- injector means for each cylinder adapted to inject a determined quantity of fuel into said combustion chamber,
- ignition means for each cylinder adapted to initiate the combustion process within said combustion chamber; and
- electronic control means to control:
  - said actuator means, for adjusting the opening time and stroke of the respective intake valve,
  - said injector means, for adjusting the quantity of fuel injected into the combustion chamber of each cylinder,
  - said ignition means, to adjust the intervention time thereof.

SUMMARY OF THE INVENTION

In particular, the present invention relates to multi-cylinder internal combustion engines including, also, return spring means which pushes the valve toward a closed position, to control the communication between the respective intake pipe and the combustion chamber of the respective cylinder,
- at least one camshaft to drive each intake valve of the engine cylinders through respective valve lifters, each intake valve being controlled by a respective cam of said camshaft,
- wherein each of said valve lifters controls the respective intake valve against the action of said return spring means through the interposition of hydraulic means comprising a pressure fluid chamber,
- the pressure fluid chamber associated with each intake valve being adapted to be connected by a solenoid valve to a discharge channel in order to uncouple the valve from the respective valve lifter and causing the rapid closure of the valve due to the respective return spring means.

It is an object of the present invention to provide an internal combustion engine of the above-mentioned type such that it is susceptible to operating according to an advantageous operating mode in terms of the overall working order of the vehicle on which the engine is installed for the purposes which will be described as follows.

Such a purpose is obtained thanks to the above-mentioned electronic control means which is adapted such that during operation said means controls said actuator means, the above-mentioned injector means and the above-mentioned ignition means so as to adjust the enthalpy value of the exhaust gases produced by each cylinder independently from the other cylinders.

According to a first embodiment, the electronic control means is adapted such that during operation said means controls said actuator means, said injector means and said ignition means so as to adjust the temperature value of the exhaust gases produced by each cylinder independently from the other cylinders.

According to a further embodiment, the electronic control means is adapted such that during operation said means controls said actuator means, said injector means and said ignition means so as to adjust the pressure value of the exhaust gases produced by each cylinder independently from the other cylinders.

A preferred embodiment of the engine according to the present invention provides that said electronic control means is adapted to control:
- said actuator means of at least one first cylinder, so as to feed a greater quantity of air flow into the respective combustion chamber than that fed into a second cylinder;
- said injector means of said at least one first cylinder, so as to inject a greater quantity of fuel into the respective combustion chamber than that injected into said second cylinder;
- said ignition means of at least said one first cylinder so as to create a lower spark advance, than that of said second cylinder.

As noted above, the internal combustion engine according to the present invention provides the opportunity to adjust the quantity of fuel, the quantity of air and the spark advance for one or more engine cylinders independently from the other cylinders.

In particular, in some steps of its operation the engine according to the present invention provides to work according to such a mode that the exhaust gases produced in one or more cylinders will have a greater enthalpy than the exhaust gases produced in the other cylinders. This object is obtained providing that in one or more engine cylinders the intake valve, the injector means and the ignition means carry out a combustion process whose main effect is not to generate work on the cylinder piston, but to produce exhaust gases with high enthalpy which can be therefore desirably exploited as will be described later.

This operating mode according to the present invention can, for example, be provided in a transient starting step of a vehicle on which the engine described herein is installed. In this case, as will be better described later, the energetic properties of the exhaust gases produced by the engine according to the present invention are desirably exploited for the heating of the catalytic converter of the vehicle. In fact, thanks to the high temperature of such exhaust gas, as noted above, which is considerably higher than that of the exhaust gases produced in a conventional operating mode of the engine, the thermal exchange between such gases and the catalytic converter itself has faster dynamics than those that occur during conventional mode, so that the activation time of the catalytic converter is therefore considerably reduced.

This can be carried out, similarly, with reference to a further application wherein, the exhaust gases produced according to the operating mode of the present invention are used to drive a turbocharger associated with the engine. In the latter case, thanks to the fact that the energy of said gas is greater than that of the gases produced in a conventional operating mode of the engine, a considerable reduction of the response time of the turbocharger than that normally expected in applications with conventional engines is obtained.

BRIEF DESCRIPTION OF THE DRAWINGS

Further features and advantages of the invention will be clear from the following description with reference to the attached drawings, provided by way of a non-limitative example, in which.

DETAILED DESCRIPTION OF THE INVENTION

The present invention relates to the technical field of spark ignition internal combustion engines which provide an actuation system of the valves which is the subject matter of several patents by the same Applicant.

Figure 3:
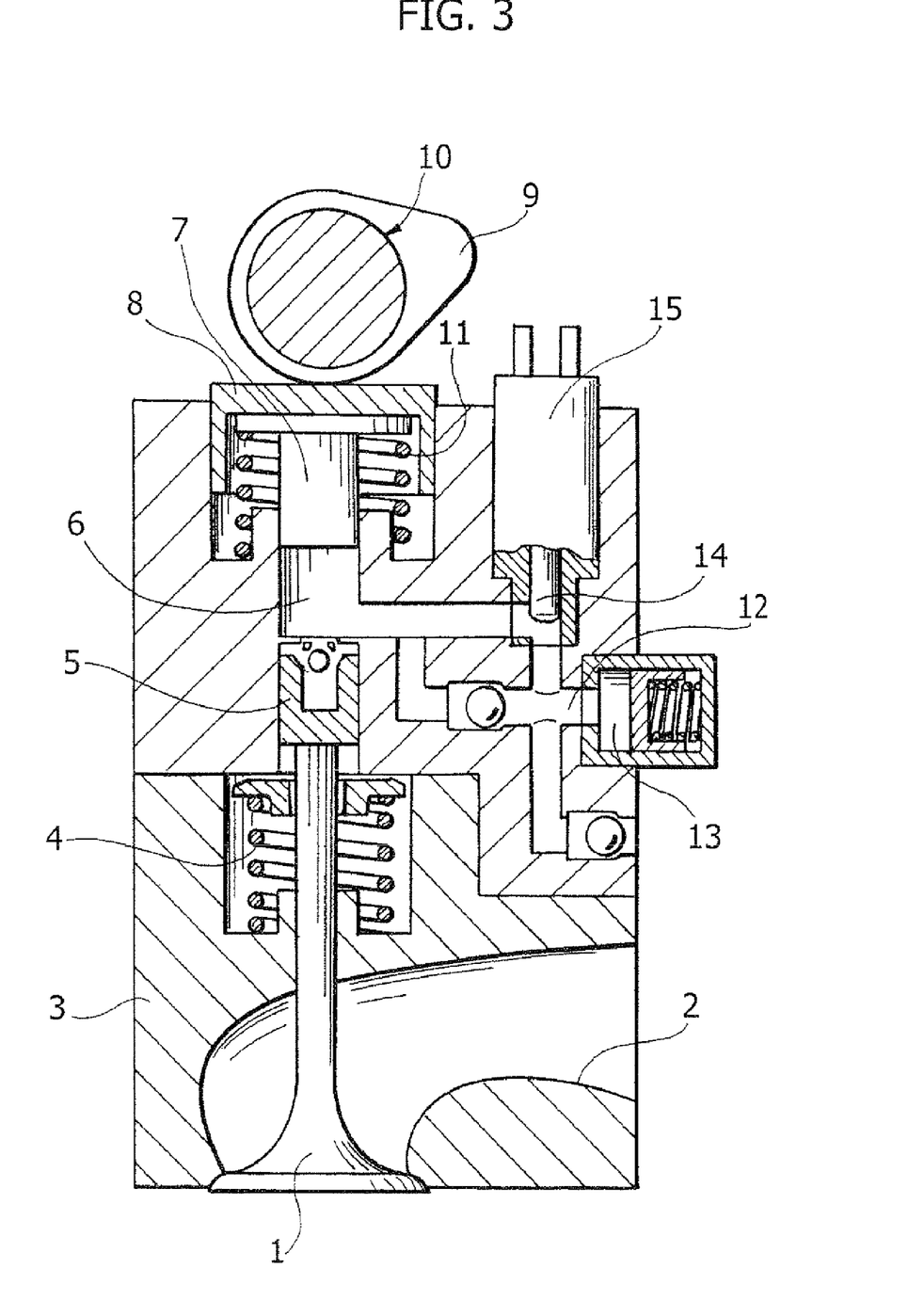
FIG. 3 is a schematic sectional view of a prior art engine, which shows the operating principle of a variable driving system of the engine valves.

FIG. 3 shows schematically the operation principle of the variable driving system of the valves. Reference numeral 1 designates the valve as a whole (which can be either a intake valve or an exhaust valve) associated with a respective pipe 2 (intake or exhaust) formed in an internal combustion engine head 3. The valve 1 is returned towards its closing position (upward with reference to FIG. 3) by a spring 4, whilst this is forced to open by a piston 5 acting on the upper end of the valve stem. The piston 5 is controlled, in turn, through the pressure oil which is within a chamber 6 by a piston 7 that supports a bowl 8 cooperating with a cam 9 of a camshaft 10. The bowl 8 is held by a spring 11 in sliding contact with the cam 9. The pressure chamber 6 can be connected to a pipe 12, which, in turn, communicates with a pressure accumulator 13, through the shutter 14 of a solenoid valve 15 which is controlled by electronic control means (not illustrated) according to the engine operating conditions. When the solenoid valve 15 is opened, the pressure oil which is within the chamber 6 is discharged, hence the valve 1 closes quickly under the effect of the return spring 4.

When the solenoid valve 15 is closed, the oil within the chamber 6 transmits the movements of the piston 7 to the piston 5 and therefore to the valve 1, hence the position of the valve 1 is determined by the cam 9. In other words, the cam 9 normally controls the opening of the valve 1 according to a cycle which depends on the cam profile, but it can be "disabled" whenever required, opening the solenoid valve 15, hence interrupting the connection between the piston 7 and the valve 1.

The internal combustion engine according to the present invention is also provided with injector means (not shown) for each cylinder, which are adapted to carry out the injection of a determined amount of fuel within the combustion chamber of the cylinder itself. Ignition means is also provided on each cylinder in order to trigger, at a determined time, the combustion process within said combustion chamber.

Furthermore, the internal combustion engine according to the present invention provides electronic control means which controls respectively the driving of each solenoid valve, of the injector means, and of the ignition means.

In particular, each solenoid valve is controlled so as to adjust the opening time and stroke of the intake valve thereof and, therefore, to make a desired quantity of air flow into the combustion chamber of the respective cylinder.

Whereas, the injector means is controlled, so as to adjust the duration of fuel injection carried out within the combustion chamber of each cylinder and therefore to adjust the quantity of fuel introduced therein.

Finally, the ignition means is controlled so as to trigger the combustion process within the combustion chamber of each cylinder at a given time corresponding to the particular advance time with respect to the cylinder itself reaching top dead centre condition.

The electronic control means coordinates the actuations of each solenoid valve, the injector means and the ignition means so as to generate the operating modes of the engine which meet the torque requests from the outside. On this matter, the "useful" torque generated by an engine is assessed as the average torque value calculated on the basis of the instantaneous torque values generated on each engine cylinder in the time corresponding to an engine cycle. As will be better described later, in order to guarantee a given average torque value, the internal combustion engine according to the present invention provides an alternative operating mode to those normally used by the conventional type engine, obtaining the already above-mentioned advantages, which correspond to better efficiency and to better performance of the vehicle.

Figure 1A:
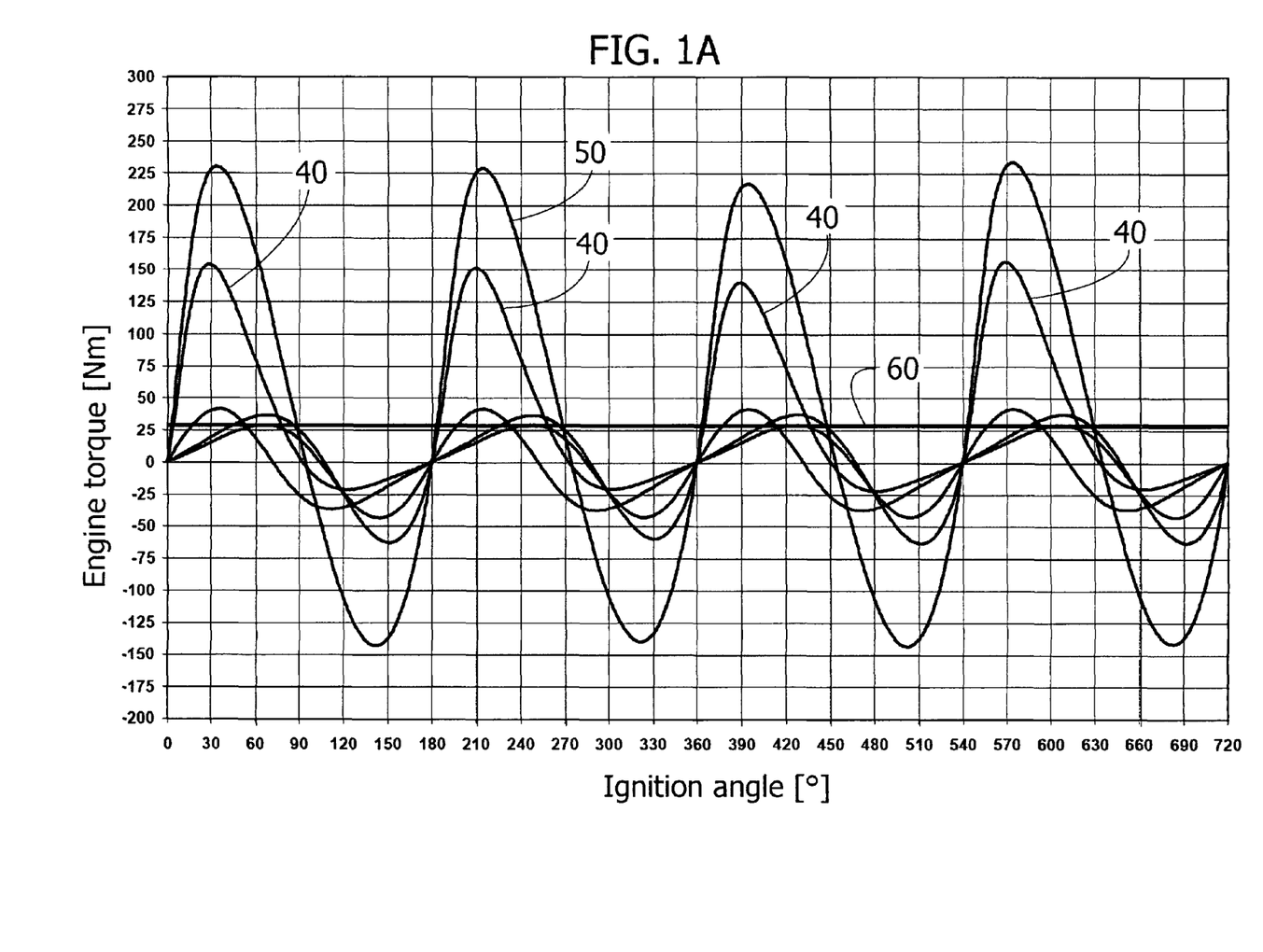
FIGS. 1a and 1b show respectively a diagram representing the operation of a conventional internal combustion engine.
Figure 1B:
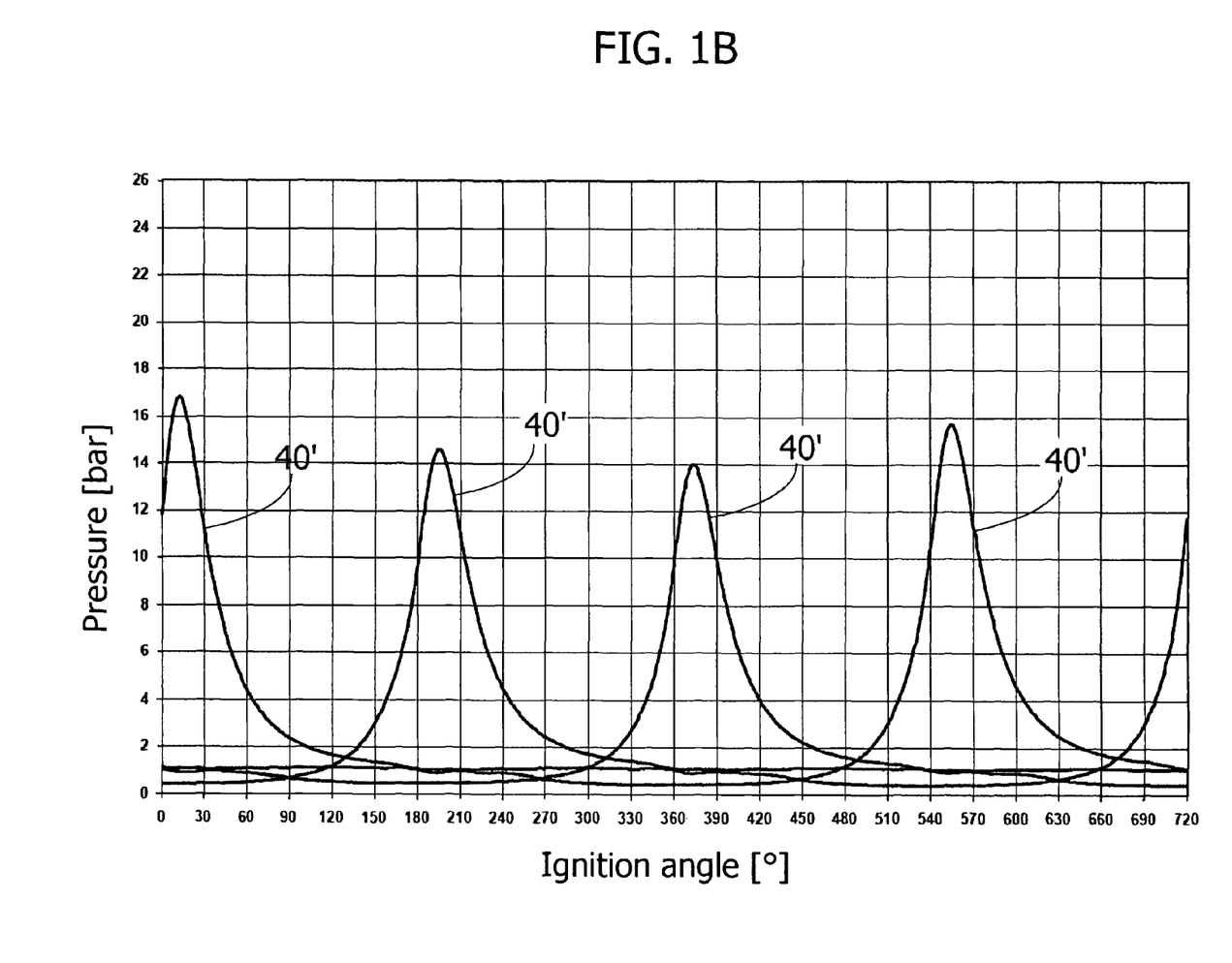

FIGS. 1a and 1b show two diagrams representing the typical operation of a spark ignition and conventional internal combustion engine provided with four cylinders. These diagrams are experimentally derived during the operation of the engine considered herein. In particular, FIG. 1a represents the trend (line 40) of the instantaneous torque values generated on the respective engine cylinders upon the variation of the ignition angle. The same Figure also represents the trend (line 50) of the resulting torque, given the sum for each instant, or for each value of the ignition angle, of the values of the aforesaid torques, and the average torque value (line 60) which is produced in the 720° cycle of the ignition angle. Whereas, FIG. 1b represents the trend (40') of the pressures within the respective engine cylinders upon the variation of the ignition angle.

As can be seen in FIGS. 1a and 1b, the conventional operating mode of an internal combustion engine provides that the same operating conditions are implemented on all cylinders. In fact, with reference to FIG. 1a, all four engine cylinders act such that they generate a maximum instantaneous torque value of about 150 Nm. Such a condition provides determined quantities of air and fuel, as well as a given ignition time, each of such parameters being equally determined on the several cylinders in order to produce the above-mentioned torque value of about 150 Nm for each cylinder. The average torque value is equal to about 29 Nm.

Figure 2A:
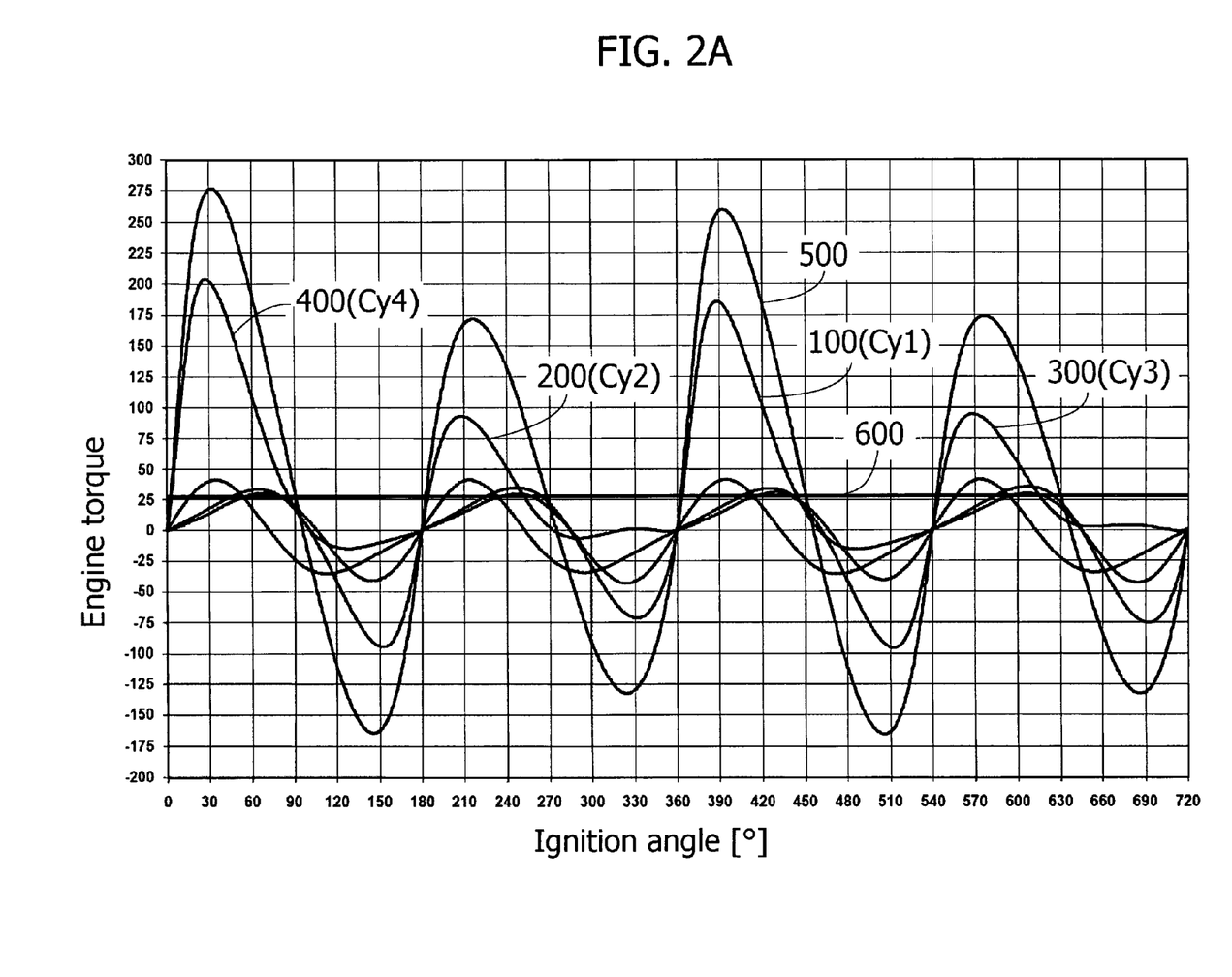
FIGS. 2a and 2b each show a diagram representing the operation of an engine according to the present invention.
Figure 2B:
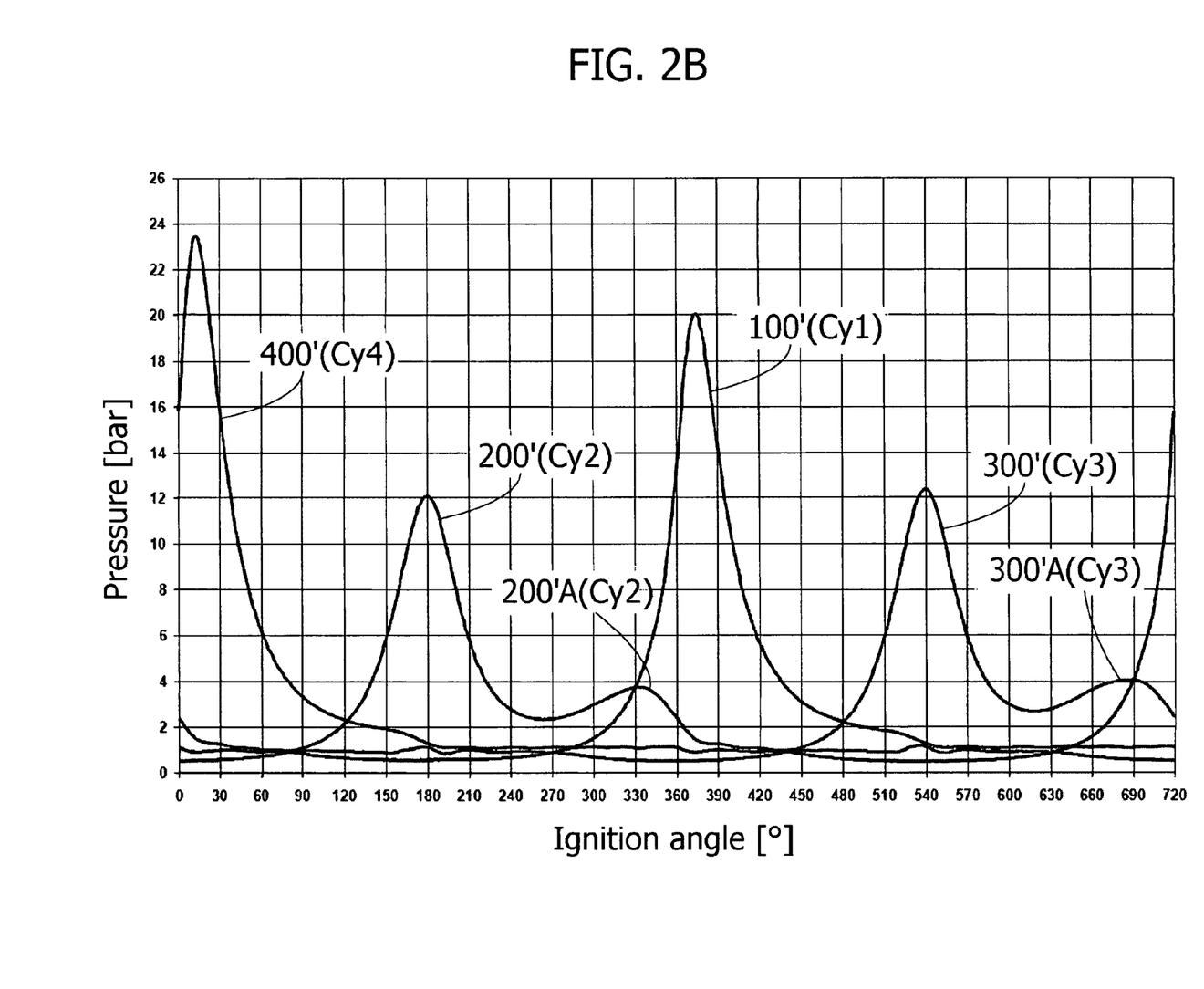

FIGS. 2a and 2b are diagrams similar to those of FIGS. 1a and 1b, but representing the operating mode of an internal combustion engine according to the present invention. These diagrams are experimentally derived during the engine operation according to the present invention.

Specifically, also in this case, the example refers to a spark ignition internal combustion engine provided with four cylinders. Furthermore, in order to compare the diagrams of FIGS. 1a and 1b, the operating mode which has been considered in FIGS. 2a and 2b also concerns a condition in which the engine is adapted to generate an average torque value of about 29 Nm, like in the example of FIGS. 1a and 1b.

Generally, the operating mode practicable by the engine according to the present invention provides that one or more engine cylinders operate in different conditions from the other cylinders. These differentiated conditions derive from actuation modes of the solenoid valve, the injector means and the ignition means which differ in order to cause combustion processes with different characteristics and purposes in one or more above-mentioned engine cylinders than those in the other cylinders.

With reference to the Figures, FIG. 2a shows the trends of the instantaneous torque value generated on the respective cylinders upon the variation of the ignition angle where the lines 100, 200, 300 and 400 represent the trends of the torque values respectively generated on the cylinders indicated (in brackets) like Cy1, Cy2, Cy3, and Cy4. Line 500 represents the trend of the resulting torque upon the variation of the ignition angle, and finally, line 600 represents the average torque value equal to about 29 Nm generated by the engine in a 720° cycle of the ignition angle.

Whereas, FIG. 2b represents the trends of the pressure values for each cylinder upon the variation of the ignition angle, where the lines 100', 200', 300', 400' respectively represent the trends of the pressure values for the cylinders Cy1, Cy2, Cy3, and Cy4.

From FIGS. 2a and 2b it is understood that cylinders Cy2, Cy3 have different operating modes from those of cylinders Cy1, Cy4. For example, it can be seen that the maximum torque values generated on cylinders Cy2, Cy3 (about 100 Nm) are considerably lower than the maximum torque values obtained in cylinders Cy1 and Cy4 (over 175 Nm).

After a comparison between the operating diagrams of cylinders Cy2, Cy3, Cy1, and Cy4, it is understood that the combustion processes taken place in such cylinders have been suitably differentiated. As already mentioned above, this differentiation of the operating conditions between one cylinder and another is obtained thanks to a control carried out by the above-mentioned electronic means which carries out, correspondingly, actuations of the solenoid valves, of the injector means and of the ignition means, which differ between the cylinders adapted to operate in mutually different conditions.

In particular, with reference to the specific example of FIGS. 2a and 2b, the electronic control means is adapted to control:

the solenoid valves associated with the cylinders Cy2 and Cy3, so as to make a greater quantity of air flow into the combustion chamber of such cylinders than that sucked into the cylinders Cy1, Cy4;

the injector means associated with the cylinders Cy2, Cy3, such that in the a greater quantity of fuel is injected into the respective combustion chamber than that injected into the cylinders Cy1, Cy4;

the ignition means of the cylinders Cy2, Cy3, so as to carry out a very delayed spark advance compared to that determined in the cylinders Cy1, Cy4.

Substantially, the electronic control means acts such that the combustion processes which occur in the cylinders Cy2 and Cy3 will have, as a main effect, the production of exhaust gases with high enthalpy. Generally, the combustion energy is not "exploited" for the torque and power generation on the cylinder but to produce gases with high energy. This is mainly obtained by determining an actuation time of the ignition means which is distanced (lowered) compared to the optimal advance time upon reaching the top dead centre condition in the cylinder, which a person skilled in the art usually looks for in order to obtain optimal combustion for torque generation on the cylinder itself.

In FIG. 2b, it is understood that the ignition time is, so to speak, lowered compared to an optimal advance time by the presence of second pressure peaks 200'a, 300'a of the lines 200' e 300' which occur in line with the driving shaft values after the top dead centre is reached in the respective cylinders Cy2 and Cy3, and which are then representative of the triggering of combustion in the two cylinders.

The exhaust gases produced in the cylinders Cy2, Cy3, and generally, the exhaust gases with high enthalpy produced according to the above-mentioned modes for the engine according to the present invention, can be desirably exploited as described as follows.

For example, as already mentioned above, such exhaust gases can be exploited for heating the catalytic converter of the vehicle on which the engine according to the present invention is installed.

In fact, as is known in the art, in order to begin operating reliably and efficiently, the catalytic converter must be at a determined activation temperature. Beginning with an initial starting step of the vehicle, this temperature is reached thanks to the heat exchange which occurs between the engine exhaust gases and the catalytic converter itself. In the case of the present invention, the exhaust gases with high enthalpy allow very quick thermal dynamics to be obtained between the catalytic converter and the gases themselves, and to considerably reduce the activation time of the catalytic converter compared to conventional applications.

Similarly, the exhaust gases with high enthalpy of the internal combustion engine according to the present invention can be used to drive a turbocharger associated with the engine itself. As is known in the art, the operation of a turbocharger driven by exhaust gases, provides, starting from an initial starting step, a transient step where the fluid-dynamic conditions of speed must be reached for the correct operation of the turbocharger itself. The high enthalpy of the exhaust gases produced in the mode described above of the engine according to the present invention, guarantees, also during an initial operating step of the engine and therefore also of the turbocharger, an "immediate" supercharging hence excluding the above-mentioned transient step.

With reference to the operating diagrams of FIGS. 2a and 2b relative to cylinders Cy1, Cy4, it is possible to observe how the operating modes of such cylinders provide maximum instantaneous torque values (for both over 175 Nm) which are higher than the torque values created by cylinders with conventional operation of FIGS. 1a and 1b (about 150 Nm).

This condition is explained by the fact that, in the engine described herein operating in the mode according to the present invention, the cylinders which provide a combustion process, mainly destined for torque generation, are set considering the operating mode of the cylinders acting as gas producers with high enthalpy, and therefore in such a way to be able to develop an average torque value equal to that requested by the engine in any case.

Consequently, the electronic control means carries out a suitable control of the solenoid valves, the injector means and the ignition means of the cylinders Cy1 and Cy4, in order to guarantee the overall engine operation which provides such a "useful" requested average torque value which, in the case of the example of FIGS. 2a and 2b, is equal to about 29 Nm. In this case, to compensate for the low torque values generated by cylinders Cy2 and Cy3, operating in the mode according to the present invention, cylinders Cy1 and Cy4 are therefore set to produce torque values that are greater than the ones corresponding to a conventional operating mode, in order to obtain an overall average torque value of 29 Nm.

The operating mode for an internal combustion engine according to the present invention can be provided in an initial starting step of the engine in order to obtain the above-described advantages associated with the overall operation of the vehicle where the engine itself is installed, as well as in its normal operation because, as has been experimentally verified by the Applicant itself, advantages also in terms of consumption will be obtained. In particular, it has been verified that an operating mode of cylinders according to the present invention, in which the quantities of air are differentiated, and similarly also the fuel quantities, between the cylinders, and at the same time, an optimal spark advance is obtained on each cylinder, is susceptible to guaranteeing engine operation characterized by a considerable reduction in terms of consumption.

Naturally, various modifications to the construction details and the embodiments can be possible, within the spirit of the invention according to that described and disclosed merely by way of example, without departing from the scope of the present invention.

What is claimed is:

1. Multi-cylinder internal combustion engine, comprising:
   at least one intake valve for each cylinder to control the communication between the respective intake pipe and the combustion chamber of the respective cylinder,
   wherein each intake valve is controlled by actuator means to feed a determined quantity of air into said combustion chamber, said actuator means being adapted to control the respective intake valve independently from the other cylinders and according to a variable actuation method,
   injector means for each cylinder adapted to inject a determined quantity of fuel into said combustion chamber,
   ignition means for each cylinder adapted to initiate the combustion process within said combustion chamber; and
   control means to control:
      said actuator means, for adjusting the opening time and stroke of the respective intake valve,
      said injector means, to adjust the quantity of fuel injected into the combustion chamber of each cylinder,
      said ignition means, to adjust the intervention time thereof,
   wherein said control means are such that during operation said control means control said actuator means, said injector means and said ignition means, so as to adjust the enthalpy value of the exhaust gases produced by each cylinder independently from the other cylinders,
   said control means being apt to control:
      said actuator means of at least one first cylinder, for feeding a greater quantity of air into the respective combustion chamber than that fed into a second cylinder;
      said injector means of said at least one first cylinder so as to inject a greater quantity of fuel into the respective combustion chamber than that injected into said second cylinder;
      said ignition means of said at least one first cylinder so as to have a lower spark advance than that of said second cylinder,
   for the purpose of carrying out within said at least one first cylinder a combustion process which is not optimized for torque generation, but rather for producing exhaust gases with high enthalpy,
   and wherein the control means are apt to control the actuator means, the injector means and the ignition means of the other cylinders for the purpose of carrying out combustion processes therein that guarantee that a requested torque is produced anyway by the engine.

2. Engine according to claim 1, wherein said control means is adapted such that during operation said means controls said actuator means, said injector means and said ignition means, so as to adjust the temperature value of the exhaust gases produced by each cylinder independently from the other cylinders.

3. Engine according to claim 1, wherein said control means is adapted such that during operation said control means controls said actuator means, said injector means and said ignition means, so as to adjust the pressure value of the exhaust gases produced by each cylinder independently from the other cylinders.

4. Engine according to claim 1, wherein it includes:
   return spring means which pushes the valve towards a closing position, to control the communication between the respective intake pipe and the combustion chamber of the respective cylinder,
   at least one camshaft to drive each intake valve of the engine cylinders by respective valve lifters each intake valve being controlled by a respective cam of said camshaft,
   wherein each of said valve lifters controls the respective intake valve against the action of said return spring means by the interposition of hydraulic means comprising a pressure fluid chamber,
   the pressure fluid chamber associated with each intake valve being adapted to be connected by a solenoid valve having a discharge channel in order to uncouple the valve from the respective valve lifter and causing the rapid closure of the valve due to the respective return spring means.

5. Engine according to claim 1, wherein said control means is adapted to control:
   said actuator means of at least one first cylinder for feeding a lower quantity of air into the respective combustion chamber than that fed into a second cylinder;
   said injector means of said at least one first cylinder, so as to inject a lower quantity of fuel into the respective combustion chamber than that injected into said second cylinder;
   said ignition means of said first and second cylinders, so as to create an optimal spark advance in both said first and second cylinders.

6. Operating method of an internal combustion engine of the type comprising:
   at least one intake valve for each cylinder to control the communication between the respective intake pipe and the combustion chamber of the respective cylinder,
   wherein each intake valve is controlled by actuator means to feed a determined quantity of air into said combustion chamber, said actuator means being adapted to control the respective intake valve independently from the other cylinders and according to a variable actuation method,
   injector means for each cylinder adapted to inject a determined quantity of fuel into said combustion chamber,
   ignition means for each cylinder adapted to initiate the combustion process within said combustion chamber; and
   control means to control:
      said actuator means, for adjusting the opening time and stroke of the respective intake valve,
      said injector means to adjust said quantity of fuel,
      said ignition means to adjust the intervention time thereof,
   wherein said method provides for controlling said actuator means, said injector means and said ignition means, so as to adjust the enthalpy value of the exhaust gases produced by each cylinder independently from the other cylinders,
   said method providing for controlling said actuator means of at least one first cylinder, for feeding a greater quantity of air into the respective combustion chamber than that fed into a second cylinder;

said injector means of said at least one first cylinder, so as to inject a greater quantity of fuel into the respective combustion chamber than that injected into said second cylinder;

said ignition means of said at least one first cylinder, so as to create a lower spark advance than that of said second cylinder, for the purpose of carrying out within said at least one first cylinder a combustion process which is not optimized for torque generation, but rather for producing exhaust gases with high enthalpy, said method providing for controlling the actuator means, the injector means and the ignition means of the other cylinders for the purpose of carrying out combustion processes therein that guarantee that a requested torque is produced anyway by the engine.

7. Method according to claim 6, wherein it provides to control said actuator means, said injector means and said ignition means, so as to adjust the temperature value of the exhaust gases produced by each cylinder independently from the other cylinders.

8. Method according to claim 6, wherein it provides to control said actuator means, said injector means and said ignition means, so as to adjust the pressure value of the exhaust gases produced by each cylinder independently from the other cylinders.

9. Method according to claim 6, wherein it provides to control:

said actuator means of at least one first cylinder, for feeding a lower quantity of air into the respective combustion chamber than that fed into a second cylinder;

said injector means of said at least one first cylinder, so as to inject a lower quantity of fuel into the respective combustion chamber than that injected into said second cylinder;

said ignition means of said first and second cylinders, so as to create an optimal spark advance in both said first and second cylinders.

10. Multi-cylinder internal combustion engine, comprising:

at least one intake valve for each cylinder to control the communication between the respective intake pipe and the combustion chamber of the respective cylinder, wherein each intake valve is controlled by actuator means to feed a determined quantity of air into said combustion chamber, said actuator means being adapted to control the respective intake valve independently from the other cylinders and according to a variable actuation method, injector means for each cylinder adapted to inject a determined quantity of fuel into said combustion chamber, ignition means for each cylinder adapted to initiate the combustion process within said combustion chamber; and control means to control:

said actuator means, for adjusting the opening time and stroke of the respective intake valve, said injector means, to adjust the quantity of fuel injected into the combustion chamber of each cylinder, said ignition means, to adjust the intervention time thereof, wherein said control means are such that during operation said control means control said actuator means, said injector means and said ignition means, so as to adjust the enthalpy value of the exhaust gases produced by each cylinder independently from the other cylinders, said control means being apt to control:

said actuator means of at least one first cylinder, for feeding a greater quantity of air into the respective combustion chamber than that fed into a second cylinder;

said injector means of said at least one first cylinder so as to inject a greater quantity of fuel into the respective combustion chamber than that injected into said second cylinder;

said ignition means of said at least one first cylinder so as to have a lower spark advance than that of said second cylinder, for the purpose of carrying out within said at least one first cylinder a combustion process which is not optimized for torque generation, but rather for producing exhaust gases with high enthalpy, wherein the control means are apt to control the actuator means, the injector means and the ignition means of the other cylinders for the purpose of carrying out combustion processes therein that guarantee that a requested torque is produced anyway by the engine, and wherein the engine further comprises:

return spring means which pushes the valve towards a closing position, to control the communication between the respective intake pipe and the combustion chamber of the respective cylinder, at least one camshaft to drive each intake valve of the engine cylinders by respective valve lifters each intake valve being controlled by a respective cam of said camshaft, wherein each of said valve lifters controls the respective intake valve against the action of said return spring means by the interposition of hydraulic means comprising a pressure fluid chamber, the pressure fluid chamber associated with each intake valve being adapted to be connected by a solenoid valve having a discharge channel in order to uncouple the valve from the respective valve lifter and causing the rapid closure of the valve due to the respective return spring means.

11. Engine according to claim 10, wherein said control means is adapted such that during operation said means controls said actuator means, said injector means and said ignition means, so as to adjust the temperature value of the exhaust gases produced by each cylinder independently from the other cylinders.

12. Engine according to claim 10, wherein said control means is adapted such that during operation said control means controls said actuator means, said injector means and said ignition means, so as to adjust the pressure value of the exhaust gases produced by each cylinder independently from the other cylinders.

13. Engine according to claim 10, wherein said control means is adapted to control:

said actuator means of at least one first cylinder for feeding a lower quantity of air into the respective combustion chamber than that fed into a second cylinder;

said injector means of said at least one first cylinder, so as to inject a lower quantity of fuel into the respective combustion chamber than that injected into said second cylinder;

said ignition means of said first and second cylinders, so as to create an optimal spark advance in both said first and second cylinders.

\* \* \* \* \*